United States Patent
Schmidtke

(10) Patent No.: US 8,544,088 B2
(45) Date of Patent: Sep. 24, 2013

(54) METHOD FOR PROTECTING A NETWORK THROUGH PORT BLOCKING

(75) Inventor: Uwe Schmidtke, Greifswald (DE)

(73) Assignee: Adtran GmbH, Berlin-Siemensstadt (DE)

( * ) Notice: Subject to any disclaimer, the term of this patent is extended or adjusted under 35 U.S.C. 154(b) by 337 days.

(21) Appl. No.: 12/667,175

(22) PCT Filed: Jun. 19, 2008

(86) PCT No.: PCT/EP2008/057824
§ 371 (c)(1),
(2), (4) Date: Jan. 18, 2010

(87) PCT Pub. No.: WO2009/003851
PCT Pub. Date: Jan. 8, 2009

(65) Prior Publication Data
US 2010/0180341 A1 Jul. 15, 2010

(30) Foreign Application Priority Data
Jun. 29, 2007 (EP) ..................................... 07012854

(51) Int. Cl.
*G06F 11/00* (2006.01)
*G06F 12/14* (2006.01)
*G06F 12/16* (2006.01)

(52) U.S. Cl.
USPC ......... 726/22; 726/3; 726/11; 726/23; 726/24

(58) Field of Classification Search
USPC .......................................... 726/22–24, 3, 11
See application file for complete search history.

(56) References Cited

U.S. PATENT DOCUMENTS

| | | | | |
|---|---|---|---|---|
| 7,149,214 | B2 * | 12/2006 | Wu et al. | 370/389 |
| 7,251,692 | B1 * | 7/2007 | Raz | 709/225 |
| 7,508,757 | B2 * | 3/2009 | Ge et al. | 370/229 |
| 7,609,625 | B2 * | 10/2009 | Wei et al. | 370/229 |

(Continued)

FOREIGN PATENT DOCUMENTS

| | | |
|---|---|---|
| CN | 1388683 A | 1/2003 |
| WO | WO 2009/003851 A3 * | 1/2009 |

OTHER PUBLICATIONS

IEEE 802.1Q; IEEE Standard for Local and metropolitan area networks, Virtual Bridged Local Area Networks, IEEE Computer Society, Sponsored by the LAN/MAN Standards Committee, IEEE 3 Park Avenue, New York, NY 10016-5997 USA, IEEE Std 802.1Q, 2005 (Incorporates IEEE Std 802.1Q-1998, IEEE Std 802.2u-2001, IEEE Std 802.1v-2001, and IEEE Std 802.1s-2002), May 19, 2006.

*Primary Examiner* — Edan Orgad
*Assistant Examiner* — Kari Schmidt
(74) *Attorney, Agent, or Firm* — Laurence A. Greenberg; Werner H. Stemer

(57) ABSTRACT

A method for protecting a network against a security attack from an user, and in particular, for a layer 2 switch, against a MAC flooding attack. Here, the MAC flooding attack floods the layer 2 switch with at least one packet, a database is provided which saves a MAC address and its allocation and the database has a maximum quantity. According to the method, an interface between the user of the network and a network access functions as a line of demarcation. When the limit of the maximum quantity for a port is reached, the port is blocked during a blocking time. This not only protects the first access node, but also the following network nodes and users respectively, against a security attack.

13 Claims, 1 Drawing Sheet

(56) References Cited

U.S. PATENT DOCUMENTS

| | | | |
|---|---|---|---|
| 7,660,259 B1* | 2/2010 | Grosser et al. | 370/252 |
| 7,716,737 B2* | 5/2010 | Wilken et al. | 726/22 |
| 7,827,272 B2* | 11/2010 | Poletto et al. | 709/224 |
| 7,992,192 B2* | 8/2011 | Maher et al. | 726/3 |
| 8,116,310 B2* | 2/2012 | Boers et al. | 370/389 |
| 8,159,936 B2* | 4/2012 | Krishnan et al. | 370/222 |
| 8,180,874 B2* | 5/2012 | Sun et al. | 709/223 |
| 2003/0055968 A1* | 3/2003 | Hochmuth et al. | 709/226 |
| 2003/0208571 A1 | 11/2003 | Yik et al. | |
| 2004/0062200 A1* | 4/2004 | Kesavan | 370/235 |
| 2004/0215976 A1* | 10/2004 | Jain | 713/201 |
| 2005/0094634 A1* | 5/2005 | Santhanakrishnan et al. | 370/389 |
| 2007/0140121 A1* | 6/2007 | Bowman et al. | 370/230 |
| 2007/0183416 A1* | 8/2007 | Gooch et al. | 370/389 |
| 2007/0230469 A1* | 10/2007 | Teshima | 370/392 |
| 2008/0253380 A1* | 10/2008 | Cazares et al. | 370/395.53 |
| 2009/0135722 A1* | 5/2009 | Boers et al. | 370/236 |
| 2009/0182854 A1* | 7/2009 | Sun et al. | 709/223 |
| 2009/0300759 A1* | 12/2009 | Wang et al. | 726/22 |

* cited by examiner

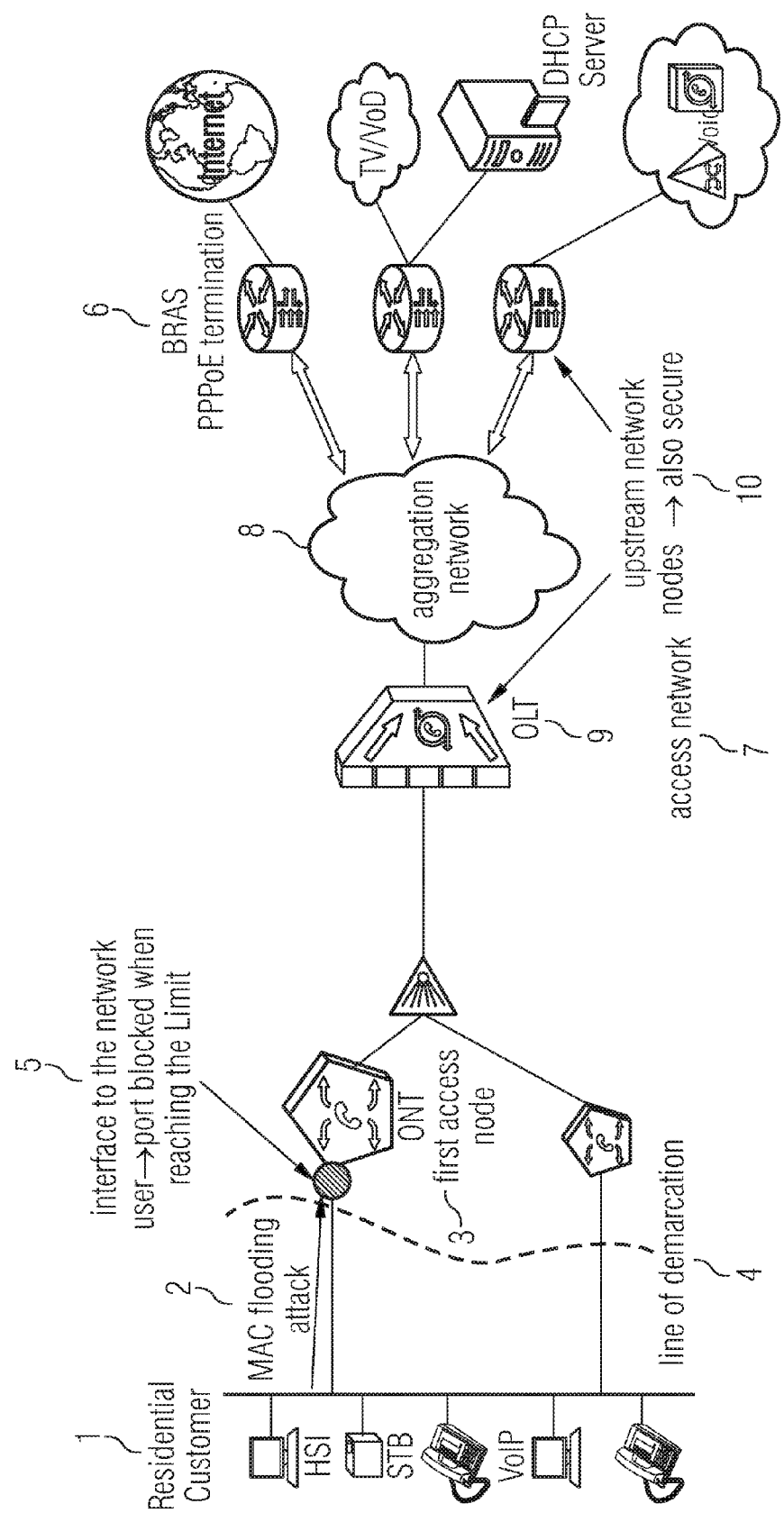

METHOD FOR PROTECTING A NETWORK THROUGH PORT BLOCKING

TECHNICAL FIELD

The present invention relates to a method for protecting a network, in general, against attacks from the user side (preferably Internet, networks of different providers and access networks) and in particular, for layer 2 switches against MAC flooding attacks.

BACKGROUND ART

The present invention relates to a method for protecting a network against a security attack from an user, and in particular, for a layer 2 switch, against a MAC flooding attack, in which the MAC flooding attack floods the layer 2 switch with at least one packet, a database is provided which saves a MAC address and its allocation and the database has a maximum quantity, according to the preamble part of claim 1.

Such a method is known in the prior art.

MAC address is short for Media Access Control address. It is a hardware address that uniquely identifies each node of a network. In IEEE 802 networks, the Data Link Control (DLC) layer of the OSI Reference Model is divided into two sublayers: the Logical Link Control (LLC) layer and the Media Access Control (MAC) layer. The MAC layer interfaces directly with the network medium. Consequently, each different type of network medium requires a different MAC layer.

Layer 2 refers to the Data Link layer of the commonly-referenced multilayered communication model, Open Systems Interconnection (OSI). The Data Link layer is concerned with moving data across the physical links in the network.

In a network, the switch is a device that redirects data messages at the layer 2 level, using the destination Media Access Control (MAC) address to determine where to direct the message.

Nowadays, layer 2 networks, as part of the Internet or of different providers and access networks, are mainly based on Ethernet technology. The nodes of an Ethernet network are represented by worldwide unique MAC addresses.

A plurality of attacks e.g. on the Internet starts with so called "MAC flooding" attacks from the direction of the attacker. Thereby, the layer 2 network is flooded with packets which contain an excessively high number of different MAC addresses. Layer 2 switches learn MAC addresses. That is, they save the allocation "MAC address to switch port" for a certain amount of time, in order to use this information for the forwarding to the correct switch port. As long as the MAC address is unknown, a packet has to be forwarded or abolished. The database which saves the MAC addresses and their allocation, further called Forwarding Database (FDB), has a physical maximum quantity. When the limit of the maximum quantity is reached and when new addresses appear, either older addresses have to be deleted, or no additional MAC addresses will be learned MAC flooding attacks use this effect. While flooding the network with different MAC addresses the limit of the FDB is reached. The frames towards all switch ports are flooded.

Thus, the attacker is also able to receive packets that are not addressed to him. He thereby gets information which could be used as a basis for further attacks.

In the case, when the switch deletes packets, in the case of unknown MAC addresses, Denial of Service (DoS) is reached. That is, the work of the switch is disrupted and other participants are affected.

Because of MAC flooding, software based MAC learning could lead to an overload of the CPU.

With the increasing use of the Ethernet technology in access networks as part of the provider nets the problem even expands. The user, at the boarder of the access network, must be seen as an user who needs to be protected as well as a possible attacker.

A prior art method of layer 2 switches for protecting against MAC flooding attacks, is by just allowing a limited number of MAC addresses per switch port and by not saving every further MAC address in its database (FDB), when reaching the limit in this port.

A further means are static entries. When the MAC addresses or address areas to special ports are known, they can be entered statically per configuration and the learning of these ports can be turned off.

When it's known, that in the normal case special ports do not communicate with each other, the forwarding between the ports can be basically turned off. This method is also called "port isolation".

A further often used method is the separation of the layer 2 network into so called "broadcast domains". That is, the layer 2 nets are separated into sections and just within these sections, forwarding, on the basis of the layer 2 addressing, is possible. A method is e.g. the layer 2 VLAN according to IEEE 802.1Q.)

However, the above described prior art methods, Port Isolation, VLAN Separation and limiting of the MAC addresses to be learned, protect just the node itself. The packets, which had actually already been identified as dangerous, reach further into the network and reach subsequent net nodes and net users respectively.

BRIEF SUMMARY OF THE INVENTION

It is the object of the present invention to provide the aforementioned method, in such a manner that not just the access node, but also the subsequent net nodes and net users respectively are secure from security attacks in the whole network.

The solution of this invention is provided by the aforementioned method, according to the invention, according to the claims, by an interface between the user of the network and a network access, which functions as a line of demarcation. When the limit of the maximum quantity for a port is reached, the port is blocked during a blocking time.

An advantageous embodiment of the method according to the invention is the fact that the limit is specified per configuration, when an alterable limit is required. The limit can also be preferably specified per default.

Another beneficial embodiment of the method is the fact that the blocking time is greater than the aging time. This makes sense since the network nodes have deleted the former MAC addresses of the corresponding port. Thereby, an overflow can be prevented.

Preferably the aging time is 200 s. However this time can be altered. Therefore, the blocking time should not be strictly bound to the time in the first node however it should be configurable.

Another beneficial embodiment of the method is the fact the blocking time can be adjusted separately. It is thereby more flexible and independent from the aging time.

Preferably the blocking time can comply with its own MAC aging time (12). Thus, after its expiration, entries in the own FDB entries are deleted.

In order to prevent strong toggling of the port state, a hysteresis can be preferably considered between blocking and unblocking. Between a reasonable upper limit of MAC addresses per port and the number of MAC addresses, from which a MAC spoofing attack is successful, is a large range. Smaller access nodes usually own a FDB in dimensions of a few thousand entries.

An advantageous embodiment is the fact that with this method it is easy to find two different reasonable limits, for blocking and unblocking of the port.

Preferably the method according to the invention can be switched off.

The invention will be further described with reference to the accompanying drawing.

BRIEF DESCRIPTION OF THE DRAWINGS

The figure shows an example of an access network, according to the invention.

DETAILED DESCRIPTION OF THE DRAWINGS

The figure illustrates an example of an access network (7). The access network (7) hereby is realised with the (help of) the PON technology. The first network node (3), the ONT, implements the here described method.

The interface (5) between the user (1) of the access network (7) and the network access, like e.g. the xDSL line or an Ethernet interface, can be seen as line of demarcation (4). In order to protect the access network (7) and its users, this is an effective point to stop the attacks already on the border of the access network (7).

Network access nodes (3) which provide the network accesses are for example the DSLAM or the ONT and the ONU of a PON network respectively.

The here described method describes an additional mechanism compared to the prior art. When the limit (17) for a port (18), per configuration or per default, provided limit (17) is reached, this port (17) is blocked for a certain amount of time (11). This blocking time (11) can be adjusted separately or can comply with its own MAC aging time (12), whereas after its expiration, entries in the own FDB (13) entries are deleted.

That is, automatically, for a certain amount of time (11), no packet (14) is received by the data plane. Effectively the port (18) is thereby logically blocked. That is, the physical layer stays active, however all incoming packets (14) are abolished. This "logical blocking" also conforms with the blocking of a port (18), as being applied with the so called "Spanning Tree" method.

So for this amount of time (11) no further packets from this port (18) reach into the access network (7). All further network nodes (10) and users (1) respectively are thereby also safe from the attack.

Reference Signs
1 Residential Customer/user
2 MAC flooding attack
3 ONT (Optical Network Terminal)/first access node
4 line of demarcation
5 interface to the network user->port blocked when reaching the limit
6 BRAS/PPPoE termination
7 network
8 aggregation network
9 OLT (Optical Line Termination)
10 upstream network nodes->also secured
11 blocking time
12 aging time
13 Forwarding database (FDB)
14 packet
15 layer 2 switch
16 MAC address
17 limit (of the maximum quantity)
18 port
19 data plane

The invention claimed is:

1. A method of protecting a layer 2 switch in a network against a Media Access Control (MAC) flooding attack from a user wherein the layer 2 switch is flooded with at least one packet, the method which comprises:
   in the layer 2 switch, providing a database for saving MAC addresses and an allocation, per physical switch port, thereof;
   establishing an interface between the user of the network and a network access as a line of demarcation;
   when a limit of the maximum quantity of MAC addresses per physical switch port is reached for a physical switch port, said interface blocking the physical switch port during a given blocking time;
   wherein the interface is an optical network terminal interface;
   wherein the blocking time is greater than an aging time; and
   wherein the MAC flooding attacks with different MAC addresses.

2. The method according to claim 1, wherein the limit of the maximum quantity is a limit per configuration.

3. The method according to claim 1, wherein the limit of the maximum quantity is a per default-provided limit.

4. The method according to claim 1, wherein the given blocking time is greater than an aging time.

5. The method according to claim 4, wherein the aging time is alterable.

6. The method according to claim 4, wherein the aging time is 200 seconds.

7. The method according to claim 1, wherein the given blocking time is a separately adjustable blocking time.

8. The method according to claim 1, wherein the blocking time can comply with its own aging time.

9. The method according to claim 1, which comprises providing a hysteresis between a blocking and an unblocking of the port.

10. The method according to claim 9, which comprises providing two different limits for blocking and unblocking of the port, respectively.

11. The method according to claim 1, wherein the method may be selectively switched off.

12. A method of protecting a layer 2 switch in a network against a MAC flooding attack, the MAC flooding attack flooding a layer 2 switch with at least one packet, the method which comprises:
   in the layer 2 switch, providing a database for saving MAC addresses and an allocation per physical switch port of the MAC addresses;
   using an interface between the user of the network and a network access to function as a line of demarcation;
   when a limit of the maximum quantity of MAC addresses per physical switch port is reached for a physical switch port, said interface blocking the physical switch port during a blocking time;
   wherein the interface is an optical network terminal interface;
   wherein the blocking time is greater than an aging time; and
   wherein the MAC flooding attacks with different MAC addresses.

13. A system for protecting a layer 2 switch in a network against a Media Access Control (MAC) flooding attack from a user wherein the layer 2 switch is flooded with at least one packet, the system comprising:
- in the layer 2 switch, a database of MAC addresses and an allocation, per physical switch port, of the MAC addresses;
- an interface as a line of demarcation between the user of the network and a network access; and
- said interface blocking the switch port during a given blocking time when a limit of the maximum quantity of MAC addresses per physical switch port is reached for a physical switch port;
- wherein the interface is an optical network terminal interface;
- wherein the blocking time is greater than an aging time; and
- wherein the MAC flooding attacks with different MAC addresses.

* * * * *